Patented Sept. 28, 1943

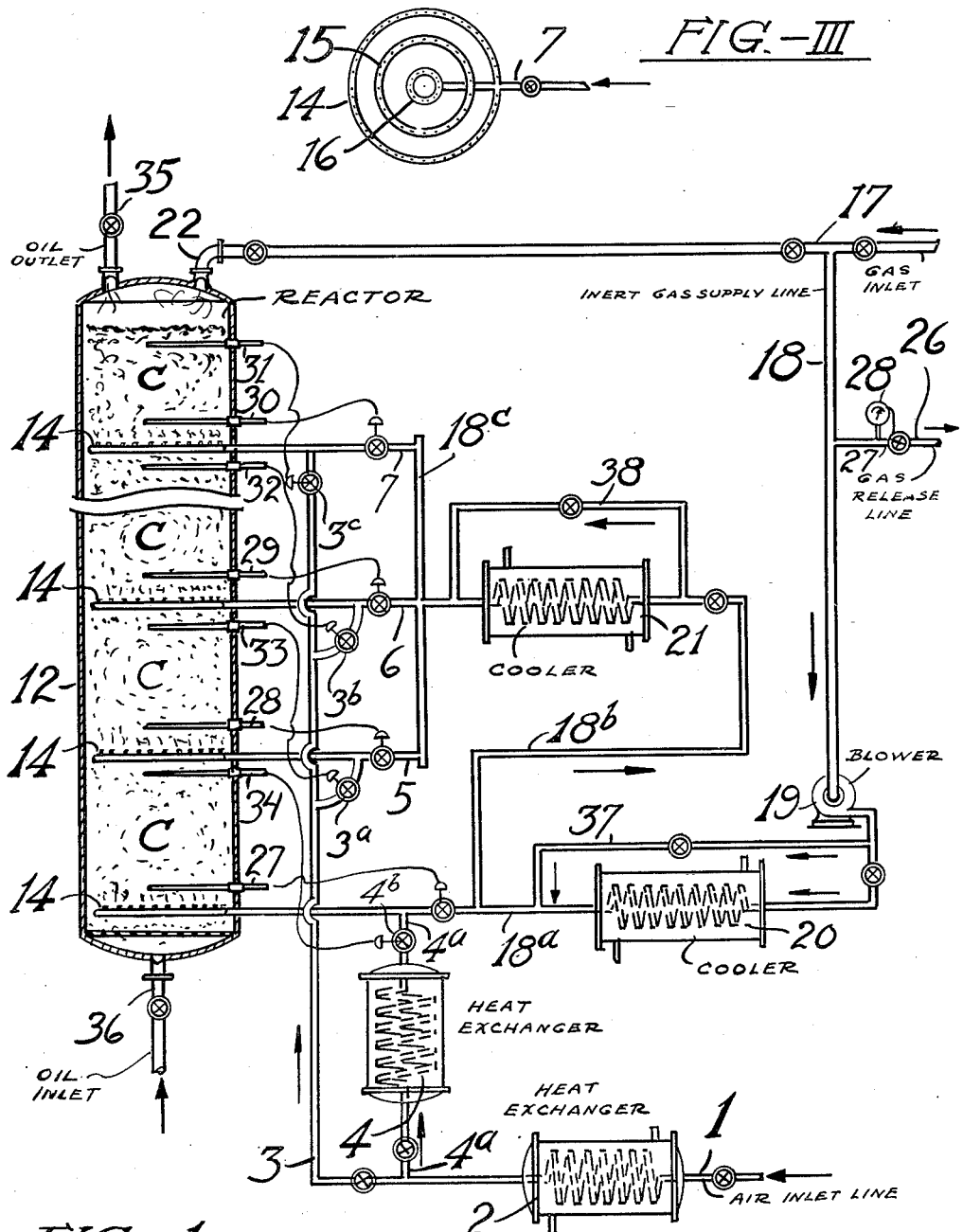

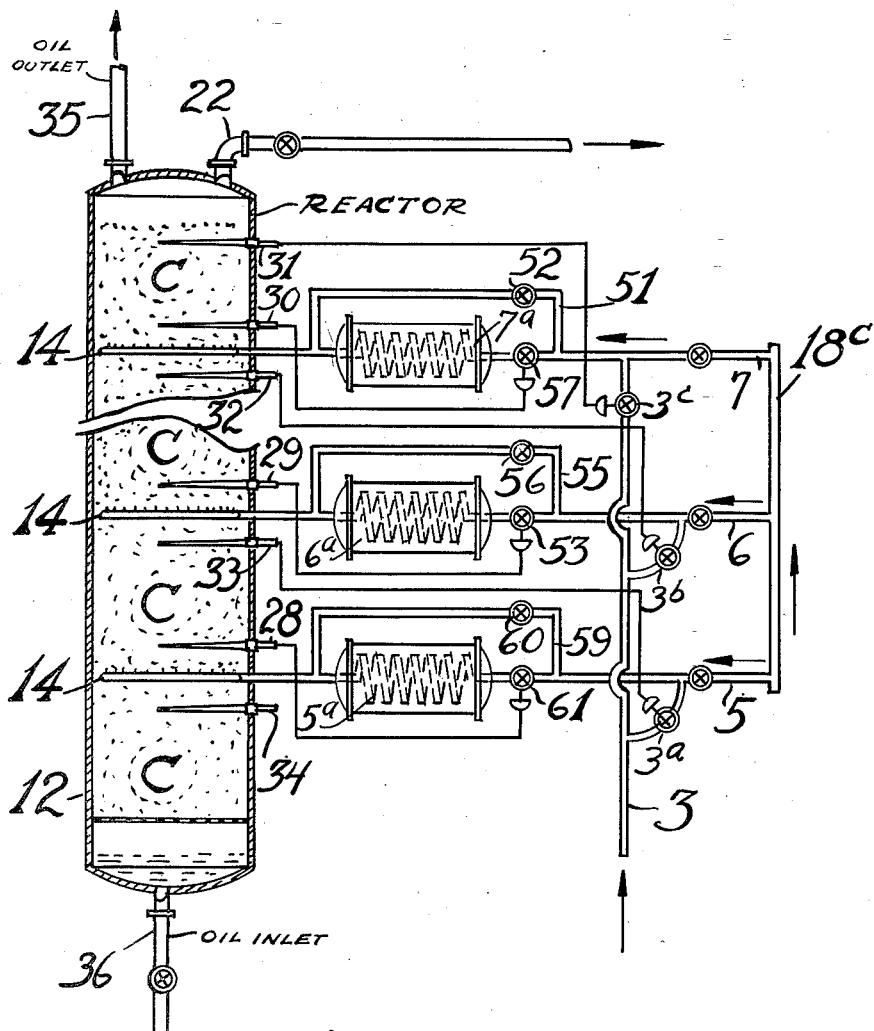
FIG.-II

2,330,767

UNITED STATES PATENT OFFICE 2,330,767

CATALYST REGENERATION

Albert B. Welty, Jr., Elizabeth, N. J., assignor to Standard Oil Development Company, a corporation of Delaware Application March 30, 1939, Serial No. 264,981

1 Claim. (Cl. 23—1)

The present invention relates to improvements in the catalytic conversion of chemical substances to desired products and the said invention is fully described in the following description and claim, reference being had to the accompanying drawings showing an apparatus selected to illustrate the invention. More particularly, the present invention relates to improvements in the regeneration or revivification of contact catalysts, which in operation in catalytic processes have become contaminated with materials which interfere with and/or impair the performance of the catalyst.

In the catalytic conversion of relatively heavy hydrocarbons, to form products of greater value, such as the catalytic cracking of relatively heavy hydrocarbons to form fractions boiling within the gasoline range, the catalytic conversion periodically and sometimes at frequent intervals, must be discontinued to regenerate and remove carbonaceous and other contaminants which have deposited upon the catalyst. Numerous methods for accomplishing catalyst regeneration are known. These methods include combustion of the contaminants to form gaseous products of combustion which may be readily pumped off or otherwise withdrawn, treatment of the contaminated or poisoned catalyst with solvents, heating the catalyst in an inert or non-oxidizing atmosphere to volatilize and/or distill off the said contaminants and others.

It is a principal object of the present invention to remove by combustion, the contaminants deposited on and/or contained in a catalyst body under conditions such that the catalyst structure is not impaired or injured and the regeneration is rapidly accomplished.

It is a further object of this invention to regenerate a solid catalyst body by causing combustion of contaminating substances causing loss of catalyst efficiency, by carrying out the combustion under closely controlled conditions of temperature.

It is a further object of this invention to prevent baking, fusion or other impairment of the catalyts during regeneration by combustion of contaminating material upon or in an elongated bed of catalyst, by supplying to the heated catalyst an oxygen-containing gas at a plurality of spaced regions within said catalyst bed, thus, in effect, securing the benefits of catalyst regeneration in the form of thin beds of catalyst.

Other and further objects will appear from the following description of the present invention.

In the drawings,

Fig. I represents in diagrammatic layout a reactor and such accessory apparatus as are necessary to carry out the invention.

Fig. II is a modification of the apparatus shown in Fig. I.

Fig. III represents a detail of one of the perforated coil tubes disposed in the reactor shown in Fig. I and through which gas is discharged into the catalyst.

Referring to Fig. I, 1 represents an air inlet pipe, 2 represents a heater, 4 is a second heater and 4—a is an air line connecting with a lower regeneration gas inlet 18—a. Pipe 3 also an air line, is in parallel with 4—a as shown and is in communication with branch lines 5, 6 and 7 of regeneration gas inlet manifold 18—c through valved pipes 3—a, 3—b and valve 3—c respectively. Fig. III shows the construction within the converter 12 of the inlet lines 5, 6, 7 and 18—a viz. that they terminate in concentric loops, coils or circles, 14, 15 and 16 of perforated tubing in the bed of catalyst C. Referring again to Fig. I, the manifold 18—c and the line 18—a supply a relatively inert gas such as carbon dioxide and/or superheated steam or some other gas which does not contain large amounts of free oxygen, the source of that gas being through inlet pipe 17 which later is in communication with some external source or the said pipe 17 may be in communication with some other catalytic unit which is capable of supplying some inert gas. Pipe 18 is the main inert gas supply line, while valved line 26 is a gas release line leading to waste heat boilers or the like. Valve 27 is controlled by a pressure regulator 28. 19 is a circulation pump or blower and 20 and 21 are coolers. Line 22 is an exhaust line through which the products of the regeneration may be removed.

Referring to Fig. I, 27, 28, 29 and 30 represent thermocouples disposed at various levels in the bed of catalyst C. These thermocouples are preferably placed immediately above the point at which the regeneration gas is admitted to the catalyst body and preferably are in electrical communication with motors adapted to operate the valves in lines 18—a, 5, 6, and 7 respectively, and automatically control the amount of inert or recycle gas admitted into reactor 12 responsive to the temperature in the reactor. Thermocouples 31, 32, 33 and 34 are in similar communication with motors adapted to operate valve 3—c and the valves disposed in lines 3—b, 3—a and 4—a respectively, and also automatically control the amount of air admitted to reactor 12.

In order to give a specific example describing a preferred method of carrying the present invention into effect, it will be assumed that an oil cracking operation employing a solid contact catalyst C, which may be a Zeolite, a solid gel, a clay or other catalyst, has been contaminated with a combustible substance which impairs or destroys the activity of the catalyst and therefore the same requires revivification or regeneration. It will be assumed that the temperature of the catalyst is in the neighborhood of 825° F. and that the amount of contaminating material is from 1 to 10% based on the weight of the catalyst. The first step in the regeneration process is to remove by purging such volatile or low boiling constituents as are deposited on or contained in the catalyst by blowing or forcing some inert gas, such as steam and/or nitrogen and/or carbon dioxide or the like through the bed of catalyst, the purging gas preferably entering reactor 12 through pipe line 35 and after having been forced through the bed of catalyst the same is withdrawn with the volatile constituents of the catalyst through line 36. As shown in the drawings, this purging gas is forced though the catalyst bed in the reverse direction to the flow of hydrocarbons during the previous cracking operation since the line 36 is designated as oil inlet whereas the line 35 is designated as oil outlet. If the catalyst is at a temperature of 825° F., the purging gas, say superheated steam, should be at a like temperature and should have a gauge pressure of say 30 lbs. per square inch more or less. It is obvious, of course, that the valves in all lines leading into the converter 12 except the valves in lines 35 and 36 should be closed to obtain the desired flow of purging gas. It is not essential to introduce the purging gas in the method just now described because good results are obtained by introducing the gas supply through line 36 and withdrawing it through line 35. Furthermore, it is entirely possible to close the valves in lines 35 and 36 and to force the purging gas through lines 17, 18, through blower 19, through line 37, through 18—b and line 38 and thence into the reactor 12 through lines 5, 6, 7 and 18—a exhausting through line 22.

In the next step or the regeneration proper, inert gas, i. e., superheated steam and/or flue gas and/or nitrogen and/or carbon dioxide or mixtures of any of these is admitted through line 17 into line 18 and then by blower 19 into cooler 20. One portion of this inert gas then passes from cooler 20 through line 18—a, into converter 12 another portion passing through line 18—b into cooler 21, from there into manifold 18—c, from there into branch pipes 5, 6 and 7, and finally into reactor 12. By pass valved lines 37 and 38 are provided to apportion the amount of recycle gas passing through coolers 20 and 21 and maintain the recycle gas before admixture with air at the proper temperature, as where the amount of gas recycled is less than the capacity of the coolers, whereupon the cooling effect would be too great if all the gas were passed through the coolers. Ordinarily, the valves in lines 37 and 38 are permanently set to admit a fixed amount of gas to by-pass the coolers, the rest of the gas passing through the coolers. Cold air is introduced into the system through line 1, is forced through heater 2 and withdrawn both through line 3 and line 4—a. Air from heater 4 in line 4—a is admitted to valve line 18—a where it intermixes with the inert gas therein and by proper control of the valves in these lines, it is possible to obtain a concentration of any desired value. In like manner, the air in line 3 is admitted to inert gas lines 5, 6 and 7 through branch valved lines 3—a and 3—b and valve 3—c, respectively, to produce a gaseous mixture containing some desired quantity of free oxygen. A concentration of about 1% to about 10% to 15% free oxygen gives good results, the higher concentrations being used near the end of the regeneration. The pressure on the system may be from about 5 lbs. per square inch to 125 lbs. per square inch in excess of the atmosphere. Under the conditions described, the gas which is discharged through the perforated coils of tubing, illustrated in Fig. III upon contact with the contaminants of the catalyst causes combustion of the same and the gases produced by combustion pass upwardly through the reactor and are withdrawn through line 22.

The amount of inert gas admitted at each level is as indicated heretofore, automatically controlled by thermocouples 27 to 30 operating, responsive to the catalyst temperature, on the valves in lines 18—a, 5, 6 and 7 respectively. In like manner, the amount of air admitted to the lines 18—a, 5, 6, and 7 is automatically controlled, responsive to the catalyst temperature, by thermocouples 31 to 34, operating on the valves in lines 3, 3—b, 3—a and 4—a, respectively.

For example, let us assume that the temperature of the catalyst at some level, say at near thermocouple 29, tends to rise. At that moment the thermocouple 29 will cause an electrical impulse to flow through an automatic electrical or electrical pneumatic device to open the motor actuated valve in line 6 so as to admit a greater quantity of inert gas. The greater quantity of inert gas admitted through line 6 will tend to cause the temperature at thermocouples 29 and 32 to drop. By means of an electrical control device similar to that described above and responsive to couple 32 the valve in line 3—b will be caused to open more widely admitting more air. The greater oxygen concentration thus produced will cause the temperature to tend to rise near thermocouple 32. When thus automatically controlled, uniform temperatures may be maintained at any given point in the region between couples 29 and 32. In like manner, the temperature of the catalyst is controlled at any zone or region in the bed of catalyst by the thermocouples located at said zone or region.

The gaseous products of the regeneration pass out of the reactor through line 22 and may be recirculated or rejected through line 26. It may or may not be necessary after there is inert gas available in line 22 to supply inert gas through line 17.

It will be understood, that the mixture of inert gas and air admitted to reactor 12 by line 18—a is normally at a higher inlet temperature say around 750° F., than the mixture of inert gas and air admitted through lines 5, 6 and 7, which gas normally will be at a temperature around 300° F. to about 600° F. The reason for this is that the catalyst in the vicinity or region of thermocouple 27 is not subjected to the same extent to the hot products of combustion, as is the catalyst in the region of, let us say, thermocouple 30, for in the case of the latter region, the products of combustion from all the lower levels in the bed of catalyst flow through this region.

Fig. II shows a modification of the layout in Fig. I. The figure represents the same sort of equipment illustrated in Fig. I except that coolers are inserted in branch lines 5, 6 and 7. In this Fig. II, similar reference characters apply to the same parts as in Fig. I and it will be understood that although the apparatus represented in Fig. II is not shown as fully as that in Fig. I, the two are the same except that, as hereinbefore indicated, the coolers are disposed in branch lines 5, 6 and 7.

According to the modification shown in Fig. I, it will be recalled that should the catalyst become too hot at some region in the bed, the same could be cooled by admitting a greater quantity of gas to that zone or region or by varying the oxygen concentration. In the modification shown in Fig. II, the temperature of the catalyst is diminished if necessary by cooling the mixture of inert gas and air entering the catalyst bed at the various levels. That is to say, should the catalyst temperature in the region of thermocouple 29 tend, to rise, valve 53 in line 6 is opened more widely so that a greater portion of the mixture of air and inert gas will pass through the cooler and lower the inlet temperature of the gas. On the other hand, when there is a tendency of the temperature of the catalyst to drop, the valve 53 in line 6 is partially closed. Valve 56 in line 55 is permanently set to regulate the total volume of gaseous mixture entering the reactor 12 through line 6. In a similar manner, the catalyst temperature in the region of thermocouple 30 may be controlled, by manipulation of valve 57 in line 7 and valve 52 in line 51. Likewise, at couple 28, the catalyst temperature may be controlled by manipulating valve 61 in line 5 and valve 60 in line 59. In this modification or that shown in Fig. I, controlling the regeneration gas supply may be manually operated.

To recapitulate, the present invention relates to the methods for closely controlling the temperature of a contact catalyst during regeneration to maintain it below about 1150° F. to 1200° F. by a combustion method and is characterized by three important features, namely, first, the temperature of the catalyst is controlled at various levels in a bed of catalyst by varying the quantity of the gas which passes through any given level or region, secondly, by controlling the temperature of the mixture of inert gas and air or oxygen which enters the bed of catalyst at any given level or region and thirdly by controlling the oxygen concentration of the inlet gas at any given level. Thus, by employing any of these methods or a combination of two or more, it is possible to rapidly regenerate the catalyst and to prevent the occurrence of hot spots, overheated regions and baking or fusion of the catalyst and to effect the regeneration of the catalyst under uniform conditions of temperature maintained safely below temperatures causing injury to the catalyst.

It is obvious to one skilled in this art that numerous modifications of the invention disclosed may be made without departing from the spirit of the present invention. That is to say, while the illustration shows a vertical, shell type converter 12, containing an elongated continuous bed of catalyst, good results can be obtained by disposing the catalyst on several horizontal trays. Furthermore, while the device shown contains merely four points of entry for regeneration gas, a smaller or larger number of intake pipes could be employed. Again, the precise structure of the perforated coils illustrated in Fig. III may be modified to provide other shapes and forms. Furthermore, the data given as to temperatures and pressures during regeneration may vary considerably, depending wholly upon the conditions, such as the amount of contaminating material deposited on the catalyst at the beginning of the regeneration phase, the character of the catalyst, the presence or absence of such regeneration aids as oxidation promoters admixed with the catalyst and for other reasons.

It has been deemed unnecessary to illustrate and describe the usual preheating and fractionating equipment employed in catalytic conversions, such as the conversion of heavy hydrocarbons to products within the gasoline range, since one skilled in the art will fully understand such apparatus may be readily adapted to the devices shown in the present drawings.

I claim:

In a process involving alternate reaction and regenerating periods in situ in which a stream of reactants is passed through a reaction zone containing a fixed mass of solid contact material for a predetermined period, the reaction process then interrupted and the contact material regenerated within said zone by burning combustible deposits formed thereon during the reaction period and wherein it is necessary to maintain the regenerating temperature within close limits to avoid impairing the effectiveness of said contact material; the improvement in the method of regenerating said contact material which comprises introducing an oxygen-containing gas at a plurality of spaced points within said chamber longitudinally of said mass to thereby cause regeneration of said mass to take place simultaneously throughout the length of said contact mass and separately and independently controlling the oxygen concentration of the gas introduced at said spaced points to maintain the temperature below a desired maximum.

ALBERT B. WELTY, Jr.